United States Patent
Nambu et al.

(10) Patent No.: US 6,872,317 B1
(45) Date of Patent: Mar. 29, 2005

(54) CHELATE-FORMING FILTER, PROCESS FOR PRODUCING THE SAME, AND METHOD OF PURIFYING LIQUID USING THE FILTER

(75) Inventors: Nobuyoshi Nambu, Yokkaichi (JP); Osamu Ito, Yokkaichi (JP); Nobutake Mihara, Chiba (JP); Takao Doi, Yokkaichi (JP)

(73) Assignee: Chelest Corporation and Chubu Chelest Co., Ltd., Osaka (JP)

( * ) Notice: Subject to any disclaimer, the term of this patent is extended or adjusted under 35 U.S.C. 154(b) by 0 days.

(21) Appl. No.: 09/674,167

(22) PCT Filed: Apr. 16, 1999

(86) PCT No.: PCT/JP99/02052

§ 371 (c)(1),
(2), (4) Date: Dec. 28, 2000

(87) PCT Pub. No.: WO99/56850

PCT Pub. Date: Nov. 11, 1999

(30) Foreign Application Priority Data

| Apr. 30, 1998 | (JP) | ............................................ 10/121195 |
| May 26, 1998 | (JP) | ............................................ 10/144875 |
| Jul. 10, 1998 | (JP) | ............................................ 10/195663 |

(51) Int. Cl.[7] ............................ B01D 15/00; C02F 1/28
(52) U.S. Cl. ................ 210/679; 210/681; 210/688; 210/767; 210/502.1; 210/508

(58) Field of Search ................................. 210/679, 681, 210/688, 508, 767, 502.1

(56) References Cited

U.S. PATENT DOCUMENTS

| 3,847,842 A | 11/1974 | Suzuki et al. ................ 521/32 |
| 6,168,863 B1 * | 1/2001 | Nambu et al. .............. 428/364 |
| 6,200,481 B1 * | 3/2001 | Nambu et al. .............. 210/681 |

FOREIGN PATENT DOCUMENTS

| GB | 1 427 832 | | 3/1976 |
| JP | 57-197040 | * | 12/1882 |
| JP | 49-63060 | * | 6/1974 |
| JP | 60-137820 | * | 7/1985 |
| JP | 61-164614 | * | 7/1986 |

* cited by examiner

*Primary Examiner*—Ivars C. Cintins
(74) *Attorney, Agent, or Firm*—Smith Patent Office

(57) ABSTRACT

A chelate-forming filter which comprises a filter medium made of natural, regenerated, or synthetic fibers wherein the fiber molecules have, incorporated therein, chelate-forming functional groups represented by general formula (1) [wherein G represents a residue of a chain sugar alcohol or of a polyhydric alcohol; and R represents hydrogen, (lower) alkyl, or -G (wherein G has the same meaning as the above G, and the two G's may be the same or different)] or (3) (wherein $R^1$, $R^2$, and $R^3$ each represents lower alkylene; and n is an integer of 1 to 4).

14 Claims, No Drawings

CHELATE-FORMING FILTER, PROCESS FOR PRODUCING THE SAME, AND METHOD OF PURIFYING LIQUID USING THE FILTER

TECHNICAL FIELD

The present invention relates to a chelate-forming filter which is capable of efficiently removing metal ions or metalloid ions and insoluble impurities in a liquid to be treated to purify the liquid, a process for producing the same, and a process for the purification of a liquid using the chelate-forming filter. According to the present invention, a variety of chelate-forming ions can be efficiently removed (or captured) and insoluble impurities can be efficiently removed, by appropriately selecting the type of a chelate-forming functional group to be introduced into a fiber constituting the filter depending on the type of ions to be removed in the liquid to be treated.

Accordingly, this filter can be effectively employed, for the purposes of, for example, ① removing (or capturing) copper, zinc, nickel, cobalt, and other heavy metal ions and insoluble impurities contained in an aqueous liquid or an oily liquid, or ② removing (or capturing) boron, germanium, arsenic, antimony, selenium, and other metalloids and insoluble impurities contained in an aqueous liquid or an oily liquid, for the purification of, specifically, industrial waste water, drinking water, water for food processing, as well as edible oils and oils for food processing.

BACKGROUND ART

A variety of harmful heavy metal ions are contained in some industrial waste water and must be sufficiently removed by a waste water treatment in view of the prevention of environmental pollution. In addition, heavy metal components contained in river water and groundwater also adversely affect the human body and sufficient measures must be taken against these heavy metal components when the river water or ground water is used as, for example, drinking water or water for food processing. Furthermore, metal having possibilities of contaminating as, for example, hydrogenation catalysts during the production of, for example, edible oils and oils for food processing must be removed as much as possible, because they affect storage stability and human bodies.

Boron, a kind of metalloids, or a boron compound is widely distributed in the natural world and is an essential element to the human body. However, it has been verified that an excess intake of this element adversely affects the human body. Cases which are supposed to be caused by human-induced pollution with boron components in rivers or ground water have been reported, which invites apprehension of bad influence of recycling such water. In addition to boron, for example, arsenic and arsenic compounds are harmful to the human body and must be removed as much as possible from, for example, drinking water which is suspected to be contaminated by these substances.

If a liquid is used as, for example, irrigation water, water for food processing, edible oils or oils for food processing, insoluble impurities must be removed, in addition to such metallic components and metalloid components.

Under these circumstances, the present invention has proceed investigations to provide a filter which can efficiently capture and remove these metal ions or metalloid ions and compounds thereof from a liquid to be treated such as water or edible oils, or further, which can efficiently concurrently remove insoluble impurities contained in the liquid to be treated to thereby purify the liquid, and to develop a technique which can purify a liquid to be treated such as water and oils using the filter.

An ion exchange resins has been conventionally widely used to remove harmful metal ions and to capture useful metal ions contained in, for example, irrigation water or waste water, but its effect of selectively adsorbing and separating low concentration metal ions is not necessarily sufficient.

A chelate resin having a property of forming a chelate with metal ions to thereby selectively capture these ions has excellent selective capturing property to metal ions, especially to heavy metal ions, and has also been effectively employed to remove or capture heavy metals in the field of water treatment. However, most of these chelate resins are prepared simply by introducing a chelate-forming functional group such as iminodiacetic acid, and do not always exhibit a satisfactory chelate-forming capability.

Conventional ion exchange resins and chelate-forming resins are bead-like resins having a rigid three-dimensional crosslinked structure imparted by a cross-linking agent such as divinylbenzene, and a rate of diffusion and permeation of metal ions or regenerates into the resins is low, and therefore, a treatment efficiency is low. In addition, in the case of disposal of the used resins which are not recycled, problems such as difficulty in incinerating and complicated volume reduction of used resins have been greatly pointed out.

As a possible solution to these problems in bead-like chelate-forming resins, a fibrous or sheet-like chelate material has been proposed (Japanese Unexamined Patent Application Publication No. 7-10925). This fibrous or sheet-like chelate material has many advantages as follows. For example, this material has a large specific surface area, and includes a chelate-forming functional group, where metal ions are adsorbed or eliminated, on its surface and therefore has an improved adsorption and elimination efficiency. In addition, incineration and other treatments of the chelate material can be easily conducted. However, the production of the fibrous or sheet-like chelate material requires a complicated process with the use of ionizing radiation, and a number of disadvantages have been pointed out in, for example, facilities, safety, and production costs.

Furthermore, the conventional chelate resins or fibrous or sheet-like chelate materials are not expected to remove insoluble impurities which contaminate a liquid to be treated in not a little amount, although they exhibit a capability of capturing metal ions to some extent as mentioned above. Accordingly, to remove such insoluble impurities to thereby sufficiently purify the liquid to be treated, the insoluble impurities in the liquid to be treated must be removed prior to or subsequent to the removal of metal ions by, for example, the chelate resin, and a treatment comprising at least two steps must be employed to yield a reliable purification effect.

Under these circumstances, the present inventors have made investigations which are intended to develop a chelate-forming fiber which has a satisfactory capability of capturing metal ions, metalloid ions, or compounds thereof, is easy to be subjected to incineration, and can be produced by a simple and safe process at low costs. As part of the results of these investigations, the present inventors developed a chelate-forming fiber obtained by allowing a fiber having, in a molecule, a hydroxyl group, an amino group, or another reactive functional group, such as cotton or another vegetable fiber or silk or another animal fiber, to react with an amine compound (preferably, for example, D-glucamine, N-methyl-D-glucamine, or dihydroxypropylamine) represented by the following general formula (2) and having a capability of forming a chelate, or with an acid anhydride of a polycarboxylic acid (preferably, for example, nitrilotriacetic anhydride, ethylenediaminetetraacetic dianhydride, or diethylenetriaminepentaacetic dianhydride) represented by the following general formula (4) to thereby introduce a chelate-forming functional group represented by the following general formula (1) or a chelate-forming functional group represented by the following general formula (3). They previously filed a patent application on this technology.

[wherein G represents a residue of a chain sugar alcohol or a residue of a polyhydric alcohol, and R represents a hydrogen atom, a (lower) alkyl group, or —G (wherein G has the same meaning as defined above and may be a group identical to or different from the aforementioned G)]

[wherein G and R have the same meanings as defined above]

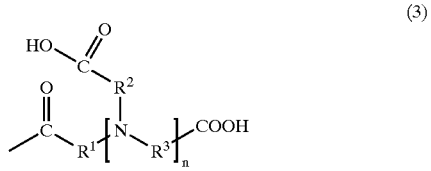

(wherein each of $R^1$, $R^2$, and $R^3$ is a lower alkylene group, and n denotes an integer of 1 to 4)

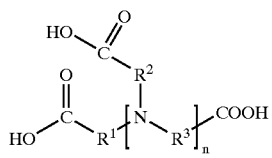

(wherein $R^1$, $R^2$, $R^3$, and n have 1 to the same meanings as defined above)

The chelate forming fiber having the chelate-forming functional group represented by the general formula (1) or (3) introduced into a fiber molecule was first developed by the present inventors and the fiber itself was novel at the time when the present patent application was filed.

The chelate fiber having the introduced functional group represented by the general formula (1) has a satisfactory capability of capturing, as a chelate, metalloid ions or compounds thereof. The chelate fiber having the introduced functional group represented by the general formula (3) has a satisfactory capability of capturing, as a chelate, copper, zinc, nickel, cobalt, and other heavy metal ions and compounds thereof.

Such a chelate fiber having the chelate-forming functional group introduced into a fiber molecule has an excellent chelate-capturing capability and can be easily produced and is thus very useful in practice in comparison with conventional granular chelate resins.

Accordingly, it is a first object of the present invention, by making use of the activity of capturing metalloids or heavy metals, or compounds thereof, and by making use of the activity of removing insoluble impurities, to provide a chelate-forming filter which can capture or remove metalloids, heavy metals, or compounds thereof and can concurrently remove insoluble impurities from a liquid to be treated and to provide a process for the purification of a liquid using the filter. The activity of capturing metalloids, heavy metals, or compounds thereof utilizes the specific characteristics of the chelate-forming fiber, i.e., satisfactory chelate-forming property, and the activity of removing insoluble impurities utilizes the specific characteristics that the chelate-forming fiber is in the form of a fiber.

Yet another object of the present invention is to provide a process for easily producing a chelate-forming filter which has both an optimum chelate-forming capability for various ions to be captured, and the capability of removing insoluble impurities.

DISCLOSURE OF THE INVENTION

The invented chelate-forming filter includes, at least as a portion of a filter material, a chelate-forming fiber having a chelate-forming functional group introduced into a molecule of a natural fiber and/or a regenerated fiber. The chelate-forming filter can capture a chelate of chelate-forming ions and can concurrently remove insoluble impurities in a liquid to be treated.

Chelate-forming functional groups to be introduced into a molecule of the fiber constituting the chelate-forming filter include a group represented by the following general formula (1) and having an amino group and at least two hydroxyl groups combined with carbon:

[wherein, G represents a residue of a chain sugar alcohol or a residue of a polyhydric alcohol, and R represents a hydrogen atom, a (lower) alkyl group, or —G (wherein G has the same meaning as defined above and may be a group identical to or different from the aforementioned G)], or an acyl group represented by the following general formula (3)

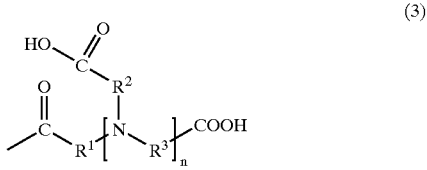

(wherein each of $R^1$, $R^2$, and $R^3$ represents a lower alkylene group, and n denotes an integer of 1 to 4).

Of the chelate-forming functional groups represented by the general formula (1), typically preferred are functional groups where G is a residue in which an amino group is eliminated from D-glucamine, or a dihydroxypropyl group, and R is a hydrogen atom or a lower alkyl group, in the general formula (1). These chelate-forming functional groups may be introduced directly into a reactive functional group in a molecule of a natural fiber and/or a regenerated fiber, or may be introduced via another reactive functional group into a molecule constituting these fibers.

The chelate-forming filter can be easily obtained by allowing an amine compound represented by the following general formula (2) and having an amino group and at least two hydroxyl groups combined with carbons:

[wherein G and R have the same meanings as defined above] or an acid anhydride of a polycarboxylic acid represented by the following general formula (4):

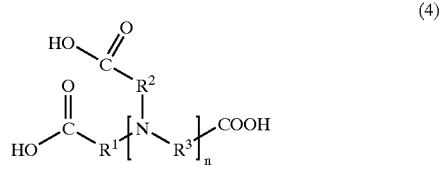

(wherein $R^1$, $R^2$, $R^3$, and n have 1 to the same meanings as defined above) to react directly with a reactive functional group in a fiber molecule constituting the filter, or to react with another reactive functional group, the reactive functional group is introduced into a molecule constituting the fiber prior to the reaction.

The chelate-forming functional group is introduced in the introduced amount calculated by the following equation of preferably equal to or more than 10% by weight, and more preferably equal to or more than 20% by weight. By ensuring to introduce the functional group within this range, the resulting chelate-forming filter can more effectively exhibit capturing and removing effect to metal ions or metalloid ions.

Introduced amount (% by weight)=[(weight of fiber after reaction—weight of fiber before reaction)/(weight of fiber before reaction)]×100

As the fiber for use in the present invention, natural fibers and/or regenerated fibers can be employed. Among them, typically preferred are natural or regenerated fibers each having a reactive functional group in a fiber molecule, of which cellulosic vegetable fibers and regenerated fibers, or silk, wool, and other animal fibers are especially preferred.

In the present invention, a filter having the functional group represented by the general formula (1) introduced into a fiber molecule exhibits a satisfactory capability of capturing, as a chelate, metalloid elements or compounds thereof (among them, boron or boron compounds), and a filter having the function group represented by the general formula (3) introduced into a fiber molecule exhibits a satisfactory capability of capturing, as a chelate, heavy metal elements or compounds thereof.

Accordingly, by allowing a fluid to pass through a device, to which the chelate-forming filter is mounted, ionic substances and insoluble impurities in the fluid can be concurrently removed and the fluid can be purified. The filter can therefore be effectively applied to the purification of various aqueous or oily liquids, as described below.

The present invention provides, in yet another aspect, a process for more easily producing the chelate-forming filter having the above performances. This process specifically includes processing a fiber into a filter, the fiber having, in a molecule, a functional group which is reactive with the chelate-forming compound, and allowing the reactive functional group in the fiber molecule to react directly, or a via a cross-linking agent, with a chelate-forming compound to thereby introduce a chelate-forming functional group into the fiber molecule.

As chelate-forming compounds for use in this process, the amine compound represented by the general formula (2) and the acid anhydride of polycarboxylic acid represented by the general formula (4) may be used. As a preferred process, a process is recommended which includes the steps of using a fiber having, in a molecule, a functional group which is reactive with an acid anhydride, allowing the fiber molecule to react with, as a cross-linking agent, an acid anhydride having a reactive double bond, and subsequently allowing the fiber molecule to react with a compound having, in a molecule, a carboxyl group and, for example, amino group, imino group or thiol group. Specifically, such compounds include, for example, amino acids, iminodiacetic acid, iminodisuccinic acid, ethylenediaminediacetic acid, ethylenediaminetriacetic acid, ethylenediaminedisuccinic acid, thioglycolic acid, thiomalic acid, thiosalicyclic acid, and mercaptopropionic acid.

BEST MODE FOR CARRYING OUT THE INVENTION

The features of the present invention will be illustrated in further detail with reference to typical chelate-forming functional groups to be introduced into a molecule of a natural fiber and/or a regenerated fiber, and processes for the introduction thereof.

A first chelate-forming filter according to the present invention has the chelate-forming functional group represented by the general formula (1) introduced into a fiber molecule constituting the filter. This chelate-forming filter can be obtained by allowing a fiber having a reactive functional group such as a hydroxyl group or an amino group in a molecule to react directly, or via another reactive functional group, with the amine compound represented by the general formula (2).

The chelate-forming fiber having the introduced chelate-forming functional group represented by the general formula (1) has a satisfactory chelate-capturing capability to metalloid ions. As shown in the following scheme (5), this configuration illustrates the capture of boron ions by a fiber filter having an introduced residue of N-methyl-D-glucamine as example:

(5)

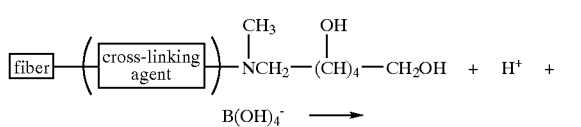

-continued

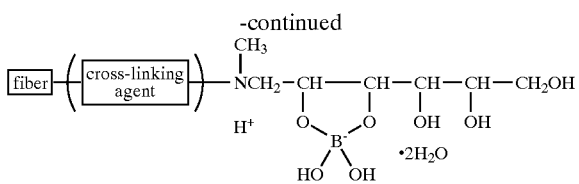

Specifically, this chelate-forming fiber has a group having an amino group and two or more hydroxyl groups, particularly a group having at least two hydroxyl groups combined with adjacent carbons introduced into a fiber molecule, and exhibits satisfactory chelate-forming capability to boron and other metalloids to thereby effectively capture the metalloids.

Preferred groups meeting these requirements are as represented by the formula (1). In the formula (1), G represents a residue of a chain sugar alcohol or a residue of a polyhydric alcohol, and R represents a hydrogen atom, a (lower) alkyl group or —G (wherein G has the same meaning as defined above and may be identical to or different from the aforementioned G). Of R, highly practicable is hydrogen or a (lower) alkyl group. In the above formula, the (lower) alkyl group includes $C_1$–$C_6$ alkyl groups, of which methyl group or ethyl group is particularly preferred.

Of the groups represented by the general formula (1), typically preferred are groups where G is a residue of a chain sugar alcohol or a residue of a polyhydric alcohol, and R is a hydrogen atom or a (lower) alkyl group. Examples of these groups include sugar alcohol residues, in which an amino group is eliminated from, for example, D-glucamine, D-galactamine, D-mannosamine, D-arabitylamine, N-methyl-D-glucamine, N-ethyl-D-glucamine, N-methyl-D-galactamine, N-ethyl-D-galactamine, N-methyl-D-mannosamine, or N-ethyl-D-arabitylamine, or dihydroxyalkyl groups. In consideration of the easiness of the introduction into a fiber molecule or the availability of materials, the most preferred is a residue, in which an amino group is eliminated from D-glucamine or N-methyl-D-glucamine, or a dihydroxypropyl group.

In this connection, groups where G in the general formula (1) is a cyclic sugar alcohol having a pyranose ring structure exhibit insufficient chelate-capturing capability to metalloids and are not desirable. This is provably because the degree of freedom of hydroxyl groups in these groups is limited.

These groups to be introduced into a fiber molecule to impart a capability of forming a chelate with metalloids may be combined directly with or indirectly with, via a cross-linking bond as mentioned below, a reactive functional group (e.g., hydroxyl group, amino group, imino group, carboxyl group, aldehyde group, or thiol group) in the fiber molecule.

As a process for introducing the metalloid chelate-forming functional group into a fiber, the following process can be employed. Specifically, such a reactive functional group as mentioned above which a fiber molecule inherently has, or a reactive functional group which is introduced by modification is allowed to react directly with the amine compound represented by the general formula (2), or the reactive functional group is allowed to react with a compound having, in a molecule, two or more functional groups such as epoxy group, reactive double bond, halogen group, aldehyde group, carboxyl group, and isocyanate group and is then allowed to react with the amine compound represented by the general formula (2).

Specifically, when the fiber molecule has, for example, hydroxyl group and carboxyl group, these groups are allowed to react directly with the amine compound represented by the general formula (2) to introduce this compound into the fiber molecule in the form of a pendant. A typical reaction in this case is as shown by the following scheme (6):

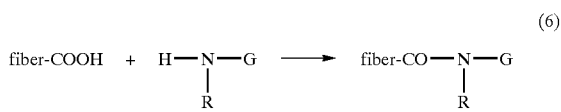

(wherein G and R have the same meanings as defined above).

When a reactive functional group in the fiber molecule has a poor reactivity with the amine compound, the fiber is first allowed to react with a cross-linking agent to introduce a functional group having a high reactivity with the amine compound into the fiber in the form of a pendant, and this functional group is then allowed to react with the amine compound to introduce a group having a metalloid chelate-forming capability into the fiber in the form of a pendant. The latter process is preferred as the process can optionally control the metalloid capturing capability (i.e., the introduced amount of a group having metalloid chelate-forming capability) according to an intended purpose, by adjusting the amounts of the cross-linking agent and amine compound with respect to the fiber.

Preferred cross-linking agents for use herein include compounds each having two or more of, and preferably two of, for example, epoxy group, reactive double bond, halogen group, aldehyde group, carboxyl group, and isocyanate group. Examples of such preferred cross-linking agents include glycidyl methacrylate, glycidyl acrylate, allyl glycidyl ether, glycidyl sorbate, epichlorohydrin, epibromohydrin, ethylene glycol diglycidyl ether, neopentyl glycol diglycidyl ether, glycerin diglycidyl ether, polypropylene glycol diglycidyl ether, maleic acid, succinic acid, adipic acid, glyoxal, glyoxylic acid, tolylenediisocyanate, and hexamethylene diisocyanate. Among them, typically preferred are, for example, glycidyl methacrylate, epichlorohydrin, and ethylene glycol diglycidyl ether.

Typical examples of reactions in the introduction of the amine compound using such a cross-linking agent as described above are as follows.

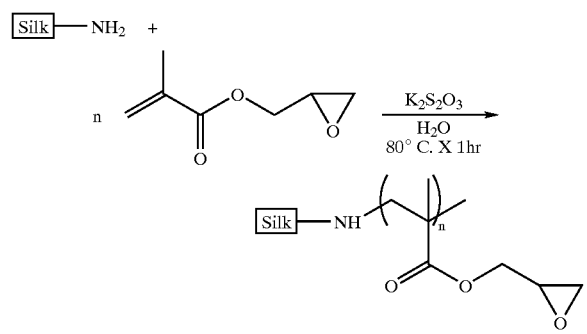

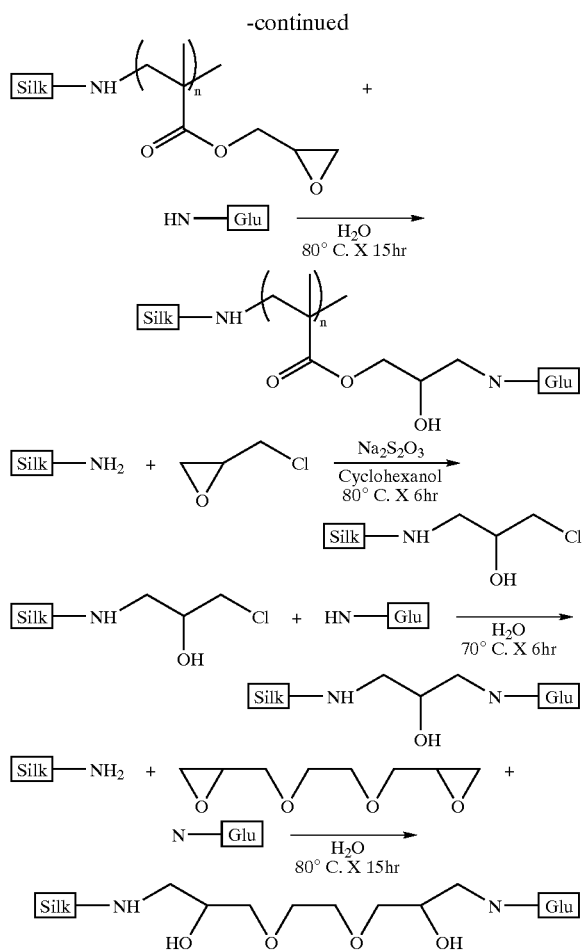

A reaction for introducing a group having a capability of forming a chelate with metalloids into a fiber constituting the filter, using such a cross-linking agent, is not particularly limited. A preferred process includes the step of allowing a fiber which has been processed into a filter to come in contact with and react with a solution containing the cross-linking agent dissolved in a polar solvent such as water, N,N'-dimethylformamide or dimethyl sulfoxide at about 60° C. to 100° C. for about 30 minutes to several ten hours, where necessary using, for example, a reaction catalyst or an emulsifier. According to this reaction, the cross-linking agent is allowed to react with a reactive functional group (e.g., hydroxy group or amino group) in a fiber molecule constituting the filter to thereby combine with the fiber, and a functional group which is readily reactive with the amine compound as represented by the general formula (2) can be introduced into the fiber molecule.

Subsequently, the fiber having the introduced functional group is allowed to come in contact with and react with a solution containing the amine compound dissolved in a polar solvent such as water, N,N'-dimethylformamide or dimethyl sulfoxide, where necessary in the coexistence of a reaction catalyst, at 60° C. to 100° C. for about 30 minutes to several ten hours, and an amino group in the amine compound reacts with a reactive functional group (e.g., epoxy group or halogen group) of the cross-linking agent to thereby yield a filter having the group represented by the general formula (1) which has a capability of forming a chelate with metalloids introduced into the fiber molecule in the form of a pendant.

This reaction is usually performed step by step, but in some reaction systems, the cross-linking agent and the amine compound are concurrently brought into contact with the filter to thereby allow the both compounds to react with a fiber constituting the filter concurrently.

Another chelate-forming filter according to the present invention has the chelate-forming functional group represented by the general formula (3) introduced into a fiber constituting the filter. The functional group is introduced by a process of allowing the fiber molecule to react with the chelate-forming compound represented by the general formula (4). Nitrogen and carboxylic acid in the acyl group introduced by this process exhibit a satisfactory capability of capturing, as a chelate, copper, zinc, nickel, cobalt, and other heavy metal ions.

The lower alkylene group represented by $R^1$ to $R^3$ in the general formula (3) includes $C_1$–$C_6$ alkylene groups, of which methylene, ethylene, and propylene are typically preferred. Particularly preferred repetition number n is 1 or 2.

When the fiber having, in a molecule, a functional group reactive with the amino compound is allowed to react with an acid anhydride of the polycaboxylic acid represented by the general formula (4), the acyl group represented by the general formula (3) is introduced into the fiber molecule in the form of a pendant. Carboxylic acids in the acyl group have a very high chelate-reactivity with metal ions, and when a liquid to be treated containing metal ions is treated with the fiber filter having the introduced acyl group, the metal ions contained in the liquid form a metal chelate and are efficiently captured.

Preferred examples of acid anhydrides of the polycarboxylic acids represented by the general formula (4) include, but are not limited to, nitrilotriacetic anhydride (NTA anhydride), ethylenediaminetetraacetic dianhydride (EDTA dianhydride), ethylenediaminetetraacetic monoanhydride (EDTA monoanhydride), diethylenetriaminepentaacetic dianhydride (DTPA dianhydride), and diethylenetriaminepentaacetic monoanhydride (DTPA monoanhydride), of which NTA anhydride, EDTA dianhydride, and DTPA dianhydride are especially preferred.

When such an acid anhydride is dissolved in a polar solvent such as N,N'-dimethylformamide or dimethyl sulfoxide and is allowed to react with a fiber as a filter material for example at about 60° C. to 100° C. for about 30 minutes to several hours, an acid anhydride group reacts with and are combined with a reactive functional group (e.g., hydroxyl group or amino group) in a fiber molecule constituting the filter. Thus, a chelate-forming functional group composed of the acyl group is introduced in the form of a pendant to thereby yield a filter which is excellent in selective adsorption of metal ions.

When the fiber molecule constituting the filter has no reactive functional group, a reactive functional group should be advantageously first introduced into the fiber by an optional means such as oxidation or graft polymerization prior to the reaction of the fiber with the acid anhydride of the polycarboxylic acid. If the fiber has, if any, a reactive functional group having a low reactivity with the acid anhydride of the polycarboxylic acid, it is also effective to introduce a reactive functional group having a high reactivity prior to the reaction of the fiber with the acid anhydride of the polycarboxylic acid.

By taking a reaction of cotton or silk with ethylenediaminetetraacetic dianhydride as example, an introduction reaction of the acyl group is schematically illustrated as follows.

(In case of cotton)

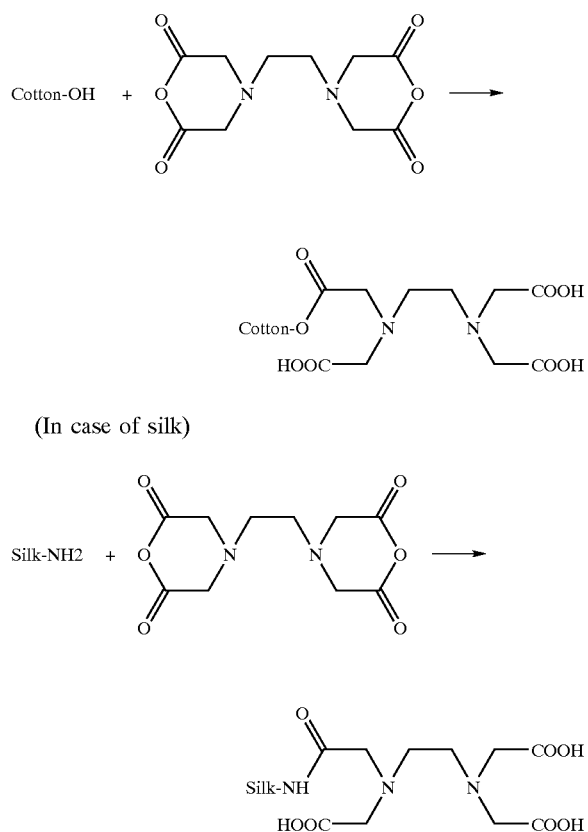

(In case of silk)

The case where the acid anhydride of the polycarboxylic acid is allowed to react with a hydroxy group or amino group in the fiber molecule is illustrated in the above scheme as a typical example. Other cases where the acyl group is introduced by using =NH, —SH, and other reactive functional groups can be considered in a similar manner.

Thus, the acyl group represented by the general formula (3) is introduced into the fiber molecule constituting the filter to yield a filter exhibiting a satisfactory selective adsorption activity to heavy metal ions and having a satisfactory capturing effect not only around neutral range but also in low pH range, and even when the filter is applied to a water to be treated having a low heavy metal ion concentration.

Metals to be captured by the filter having the introduced chelate-forming functional group include, for example, copper, nickel, cobalt, zinc, calcium, magnesium, and iron, as well as rare earth elements including scandium and yttrium, lanthanoids including lanthanum, cerium, praseodymium, neodymium, samarium, europium, gadolinium, dysprosium, holmium, erbium, and ytterbium, and radioactive elements including technetium, promethium, francium, radium, uranium, plutonium, and cesium.

Another preferred process for producing the chelate-forming filter is a process in which, using a fiber having, in a molecule, a functional group having a reactivity with an acid anhydride, the fiber molecule constituting the filter is allowed to react with an acid anhydride having a reactive double bond as a cross-linking agent, and is then allowed to react with a chelate-forming compound.

According to this process, the acid anhydride having a reactive double bond is allowed to react with a reactive functional group in the fiber molecule as described above, to thereby introduce the reactive double bond into the fiber molecule, and the reactive double bond is then allowed to react with a metal chelate-forming compound to thereby impart a capability of forming a chelate with metals to the fiber constituting the filter.

The acid anhydride having a reactive double bond for use herein may be any compound having, in a molecule, an acid anhydride group and a reactive double bond, and preferred examples thereof include maleic anhydride, itaconic anhydride, aconitic anhydride, citraconic anhydride, maleic methylcyclohexenetetrabasic anhydride, endomethylenetetrahydrophthalic anhyride, chlorendic anhydride, crotonic anhydride, acrylic anhydride, and methacrylic anhydride. Among them, an intramolecular anhydride of dibasic acid is particularly preferred. In view of the reaction efficiency and cost on introduction into the fiber molecule, maleic anhydride and itaconic anhydride are particularly preferred.

When the acid anhydride having such a reactive double band is allowed to react with the fiber in a polar solvent such as N,N'-dimethylformamide or dimethyl sulfoxide at about 60° C. to 100° C. for 30 minutes to several hours, if necessary using a reaction catalyst, the reactive functional group in the fiber molecule is combined with the acid anhydride group as a result of the reaction to thereby introduce a group having a reactive double bond into the fiber molecule.

Subsequently, when a chelate-forming compound is allowed to react with the fiber constituting the filter, into which the reactive double bond is introduced, the chelate-forming compound is added to the fiber molecule in the form of a pendant to thereby impart a metal chelate-forming capability to the fiber.

As the chelate-forming compound for use herein, a compound having, in a molecule, a functional group having a reactivity with a reactive double bond is employed. Typically preferred functional groups having a reactivity with the reactive double bond include amino group, imino group, and thiol group. These groups easily react with the reactive double bond and N or S in these groups exhibits a metal chelate-forming capability together with the coexistent carboxyl group.

When the acid anhydride having the double bond of introduced into the fiber molecule, one carboxyl group is formed by ring-opening, and this exhibits a metal chelate-forming capability, together with N or S. Therefore, the presence of the carboxyl group in the chelate-forming compound itself is not essential. The chelate-forming capability is effectively exhibited by an interaction between N or S and a carboxyl group, which coexist in the same molecule, and therefore a compound having, in a molecule, at least one selected from amino group, imino group, and thiol group, together with carboxyl group is preferably employed as the chelate-forming compound.

Specific examples of such chelate-forming compounds each having, in a molecule, at least one selected from amino group, imino group, and thiol group, together with carboxyl group include, but are not limited to, glycine, alanine, aspartic acid, glutamic acid, and other amino acids; iminodiacetic acid, iminodisuccinic acid, ethylenediaminediacetic acid, ethylenediaminedisuccinic acid, thioglycolic acid, thiomalic acid, thiosalicylic acid, and mercaptopropionic acid. Among them, iminodiacetic acid and thiomalic acid are typically preferred.

The process of allowing the chelate-forming compound to react with the fiber, into which an acid anhydride having a double bond is introduced, is not specifically limited, but may be a process of allowing a fiber material constituting the filter to come in contact with the react with a treating solution containing the metal chelate-forming compound dissolved in a polar solvent such as water, N,N'-dimethylformamide, or dimethyl sulfoxide, if necessary together with a reaction catalyst, at about 10° C. top 100° C. for 30 minutes to several ten hours. As a result of this reaction, the reactive double bond introduced into the fiber molecule constituting the filter is allowed to react with the amino group, imino group or thiol group to thereby introduce a chelate-forming group into the fiber molecule constituting the filter in the form of a pendant.

As shown in the following scheme, typical examples of such a reaction will be specifically illustrated with respect to the case where cotton is used as the fiber, maleic anhydride is used as the acid anhydride, and imindiacetic acid, ethylenediaminediacetic acid, ethylenediaminedisuccinic acid, iminodisuccinic acid, thioglycolic acid or thiomalic acid is used as the chelate-forming compound, respectively.

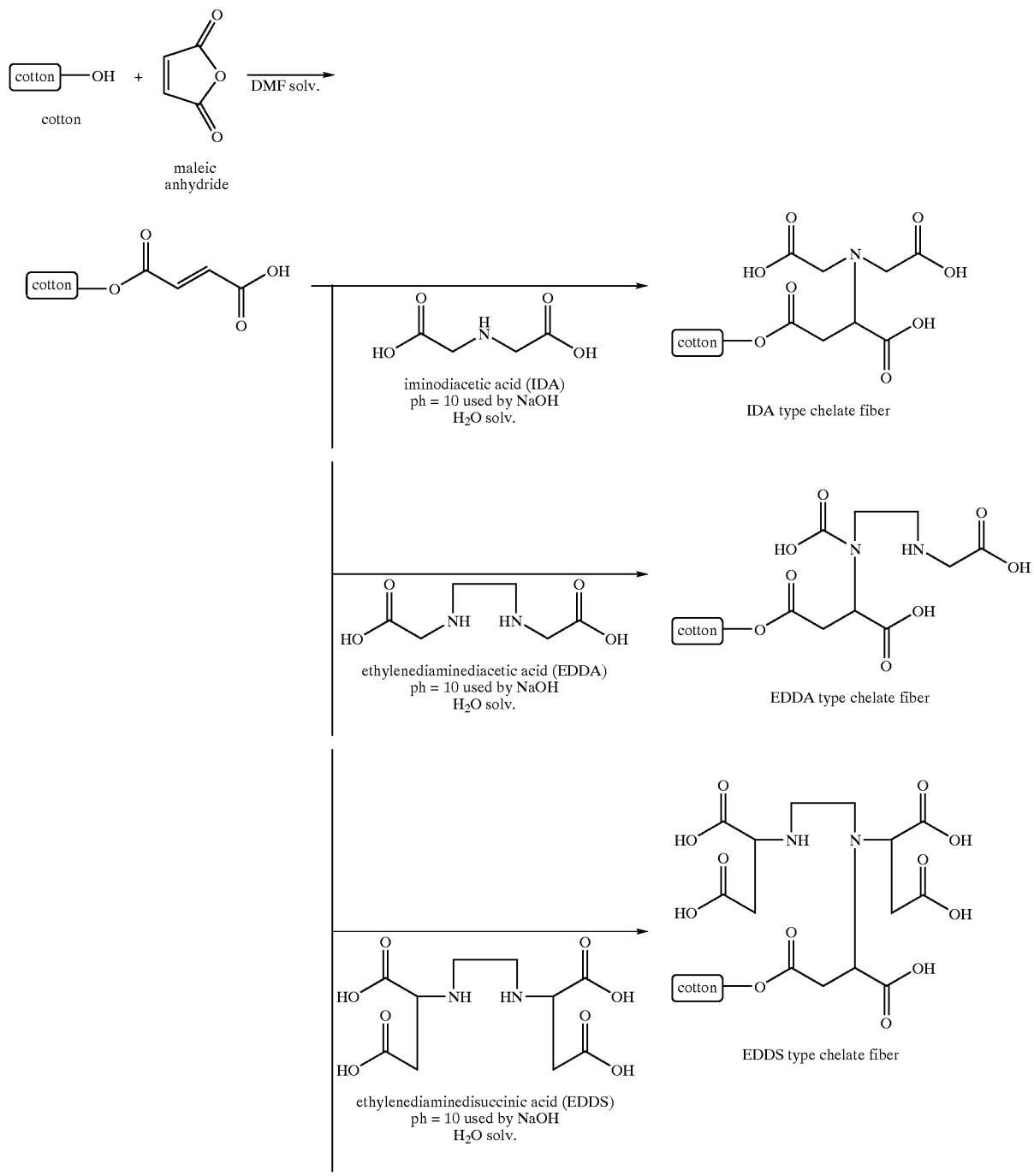

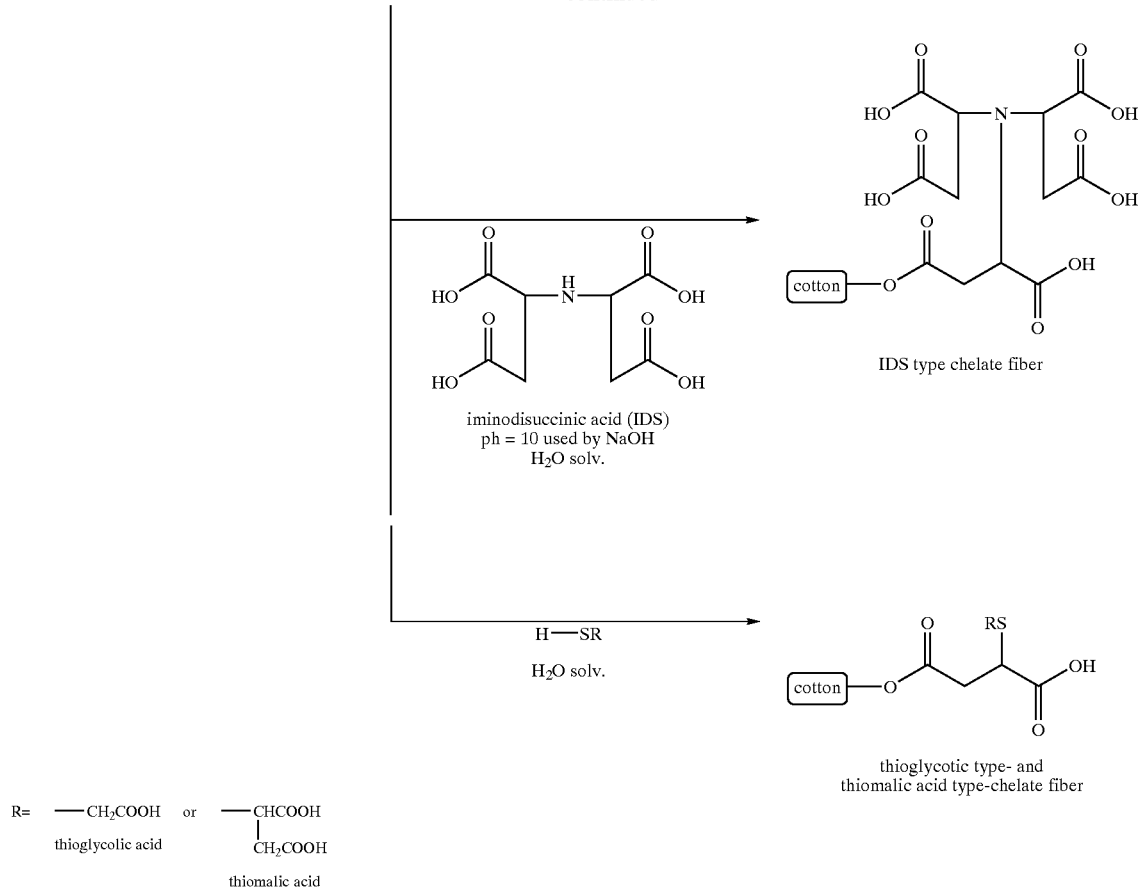

In the above scheme, the case where a hydroxyl group in a fiber molecule is allowed to react with an acid anhydride was typically illustrated, but the case where other reactive functional groups such as amino group, imino group, glycidyl group, isocyanate group, aridinyl group, and thiol group are utilized may be considered in the same manner.

Metals to be captured by the filter having a chelate-forming functional group introduced via an acid anhydride group as described above include copper, nickel, cobalt, zinc, calcium, magnesium, and iron, as well as rare earth elements including scandium and yttrium, lanthanoids including lanthanum, cerium, praseodymium, neodymium, samarium, europium, gadolinium, dysprosium, holmium, erbium, and ytterbium, and radioactive elements including technetium, promethium, francium, radium, uranium, plutonium, and cesium.

The amount of the chelate-forming functional group to be introduced into the fiber constituting the filter can be optionally controlled by the amount of the reactive functional groups in the base fiber molecule, the amount of chelate-forming compound, or the amount of the cross-linking agent, as well as conditions of reactions for introduction thereof. To impart a sufficient chelate-capturing capability to the fiber, the amount is preferably controlled so that the introduced amount calculated by the following equation becomes equal to or more than about 10% by weight, more preferably equal to or more than about 20% by weight.

Introduced amount (% by weight)=[(weight of fiber after introduction of substituent—weight of fiber before introduction of substituent)/(weight of fiber before introduction of substituent)]×100 (wherein the introduced amount means the introduced amount of the chelate-forming functional group)

To enhance the chelate-capturing capability, the higher the above introduced amount, the better. Accordingly, the upper limit of the introduced amount is not specifically limited. When the introduced amount becomes excessively high, the crystallinity of the substituent-introduced fiber is enhanced and the fiber tends to become fragile. Therefore, the introduced amount is preferably equal to or less than about 130% by weight, and more preferably equal to or less than about 80% by weight, synthetically considering practical utility as a material for capturing metals or metalloids and economical efficiency. In some uses, however, the chelate-capturing capability can also be enhanced by controlling to a high introduced amount such as 150 to 200% by weight.

The type of natural fibers and regenerated fibers to which the chelate-forming capability is imported is not specifically limited and includes, for example, cotton, hemp, and other various vegetable fibers; silk, wool, and other various animal fibers; and viscose rayon, acetate, and other various regenerated and polyamides, acrylic, polyesters, and other various fibers. These fibers may also be those which are modified, if necessary.

Of these natural fibers and/or regenerated fibers especially preferred are vegetable fibers, animal fibers, and regerated fibers each having, in a fiber molecule, a hydroxyl group, an amino group, and other reactive functional groups. Since the reactive functional groups in the fiber molecule serve to easily introduce a group having the metal chelate-forming capability, these fibers are preferred. When the material fiber itself has no reactive functional group, such a group as mentioned above can be introduced by modifying the material fiber by an optional means such as oxidation, or introducing a functional group having a higher reactivity via a cross-linking agent and introducing the aforementioned group with the use of the functional group.

Upon the production of filters for capturing various ions using the chelate-forming fiber, a process can be employed, in which an optimum chelate-forming functional group is introduced into a fiber, according to the type of the liquid to be treated, i.e., the type of ions or compounds thereof to be captured which are contained in the liquid, and the resulting fiber is processed to the form of, for example, non-woven fabric, woven fabric, knot or string, and is then processed into a filter, and the filter is then assembled into a filter device.

However, as the type of the ion to be captured varies depending on the type of the liquid to be treated, a multiplicity of chelate fibers, into which various chelate-forming functional groups are respectively introduced depending on the type of the liquid to be treated, must be prepared when the method just mentioned above is employed. In addition, the procedure of selecting a different chelate fiber according to the ion to be captured an occasion requires, processing the fiber into a filter, and assembling the filter into a filter device is not always efficient.

In contrast, as a very effective process, recommended is a process of processing a fiber into a filter, the fiber having, in a molecule, a functional group which is reactive with a chelate-forming compound, and allowing the reactive functional group in the fiber molecule to react with a chelate-forming compound having a functional group being reactive with the functional group. According to this process, the chelate-forming functional group can be introduced into the fiber after the fiber is processed into a filter. An appropriate chelate-capturing capability according to the ions to be captured can be imparted with the use of only one type of filter material, by preparing one type of filter composed of a fiber such as cotton, and introducing an optimum chelate-forming functional group according to the type of the ions or compounds thereof to be captured in the liquid to be treated.

Specifically, this process can easily introduce an optimum chelate-forming functional group into one filter by allowing an agent containing an optimum chelate-forming compound according to the use to fill or circulate in the filter, to thereby modify one filter to a chelate-forming filter which is applicable to a variety of uses.

The form of the fiber to be used herein is not specifically limited, and may be multifilament of long fibers, spun yarn of short fibers, woven or knotted fabric produced by weaving or knitting them, and non-woven fabric. It is also effective to use fibers produced by using two or more kinds of fibers in combination, or a woven or knitted fabric. In addition, wood pulp or paper, wood pieces or wood chips, and sheets can also be employed.

The construction of the filter itself is not noticeably special, and can be formed in the same manner as in filters having all known structures. Such structures include, for example, structure obtained by forming a material into a mat having a single- or multi-layer structure made of a woven/knitted or non-woven fabric having any space between fibers and assembling the mat to a suitable substrate, structure obtained by winding a string of a fiber around the outer periphery of a liquid-permeable substrate cylinder is a twill pattern several times, structure obtained by folding a woven/knitted fabric or non-woven sheet made of the aforementioned fiber in a pleated pattern and assembling the resultant to a substrate member, and bag filter obtained by forming a woven or knitted fabric made by using the aforementioned fiber into a bag.

Thus, according to the invented production process, the fiber is processed into a filter, and usually this filter is assembled into a filter device, and subsequently a treating solution containing such various chelate-forming compounds as above is allowed to circulate and come in contact with the filter, or the filter is dipped in the treating solution and is heated to an appropriate temperature according to necessary, to introduce the chelate-forming functional group into the fiber molecule constituting the filter to thereby yield a chelate-forming filter having both the chelate-capturing capability and the capability of capturing insoluble impurities.

Accordingly, by the use of a filter whose fiber density is adjusted so as to have an appropriate mesh size according to the sizes of insoluble impurities contained in the liquid to be treated, ions contained in the liquid to be treated are captured by the chelate-forming functional group and, concurrently, insoluble impurities are prevented from passing through the filter by action of the mesh of the filter, when the liquid to be treated is allowed to pass the filter. Thus, these components can be concurrently removed from the treated liquid to thereby purify the treated liquid.

In this case, the space between fibers can be optionally controlled by adjusting the thickness of the chelate-forming fiber used, the woven or knitted density, the number of lamination layer or the density of lamination, or by adjusting the density of winding, the thickness of wound layers, or the tension of winding when the fiber is obtained by winding a string of the chelate-forming fiber several times. A filter having an appropriate capability of purification according to necessity can therefore be obtained by controlling the space between fibers according to the particle sizes of insoluble impurities contaminating the liquid to be treated.

EXAMPLES

The present invention will be illustrated in further detail with reference to several examples below, which are not intended to limit the scope of the invention. Modifications can be made without departing from the purports described hereinabove and hereinafter and are also included in the technical scope of the present invention. All % below are by "weight %".

Example 1

A commercially available cartridge filter (produced by Advantec Toyo Kaisha, Ltd. under the trade name of "TCW-1-CSS", nominal pore size: 1 $\mu$m) produced by winding a cotton spun yarn around a stainless steel core material in a twill pattern was mounted to a polypropylene housing (produced by Advantec Toyo Kaisha, Ltd. under the trade name of "1PP-1-FS-000"). Separately, in 7000 ml of distilled water, 53.6 g of glycidyl methacrylate, 2.7 g of a nonionic surfactant (produced by Daiichi Kogyo Seiyaku Co., Ltd. under the trade name of "Noigen EA126"), 2.7 g of a nonionic surfactant (produced by Nippon Oils & Fats Corporation under the trade name of "Nonion OT-221"), 5.8 g of a 31% $H_2O_2$ water, and 471.2 g of a 0.5% aqueous thiourea dioxide solution were dissolved to yield a solution. The solution was circulated in the above-prepared filter at 60° C. at a flow rate of 15 liter/minute for 1 hour, using a circulating pump, to thereby graft glycidyl methacrylate to a cotton spun yarn molecule. After the reaction solution was discharged, the filter was washed by circulating 3000 ml of distilled water.

Next, 1500 g of N-methyl-D-glucamine was dissolved in 3000 ml of distilled water, and the resulting solution was circulated in the glycidyl methacrylate-grafted filter at 80° C. for 2 hours to introduce a metalloid chelate-forming functional group into the cotton spun yarn constituting the filter. Subsequently, circulation and discharge were repeated using distilled water until washings became neutral to yield a metalloid chelate-forming filter.

This metalloid chelate-forming filter was then mounted to the polypropylene housing. Separately, boric acid was dissolved in distilled water and the concentration of boron was adjusted to 10 ppm to yield a solution, and in 10 liters of this solution, 2.01 g of a fine silicon dioxide powder having a mean particle size of 10 μm was dispersed as an insoluble impurity to yield a test solution. The test solution was circulated in the above prepared filter at 25° C. at a flow rate of 15 liter/minute for 30 minutes.

The concentration of boron remained in the test solution was then determined to find that the concentration was reduced to 1 ppm or less. Separately, 1 liter of the test solution was allowed to pass through a membrane filter having a pore size of 0.1 μm and a removal percentage was determined by measuring the residual amount of silicon dioxide to find that the removal percentage was 96%.

Example 2

A metalloid chelate-forming filter prepared in the same manner as in Example 1 was mounted to the polypropylene housing. Separately, germanium oxide was dissolved in an alkali and the resulting solution was adjusted to neutral and was adjusted to a germanium concentration of 10 ppm to yield a solution. In 10 liters of this solution, 1.98 g of a fine silicon dioxide powder having a mean particle size of 10 μm was dispersed as insoluble impurity to yield a test solution. The test solution was circulated in the above-prepared filter at 25° C. at a flow rate of 15 liter/minute for 30 minutes.

Subsequently, the concentration of germanium remained is the test solution was determined to find that the concentration was reduced to 1 ppm or less. Separately, 1 liter of the test solution was allowed to pass through a membrane filter having a pore size of 0.1 μm and a removal percentage was determined by measuring the residual amount of silicon dioxide, to find that the removal percentage was 97%.

Example 3

A metalloid chelate-forming filter prepared in the same manner as in Example 1 was mounted to the polypropylene housing. Separately, arsenic trioxide was dissolved in an alkali and the resulting solution was adjusted to an arsenic concentration of 10 ppm to yield a solution. In 5 liters of this solution, 1.04 g of a fine silicon dioxide powder having a mean particle size of 10 μm was dispersed as insoluble impurity to yield a test solution. The test solution was circulated in the above-prepared filter at 25° C. at a flow rate of 15 liter/minute for 30 minutes.

Subsequently, the concentration of arsenic remained in the test solution was determined to find that the concentration was reduced to 1 ppm or less. Separately, 1 liter of the test solution was allowed to pass through a membrane filter having a pore size of 0.1 μm and a removal percentage was determined by measuring the residual amount of silicon dioxide, to find that the removal percentage was 97%.

Example 4

A metalloid chelate-forming filter was prepared in the same manner as in Example 1, except that a cartridge filter (produced by Advantec Toyo Kaisha, Ltd. under the trade name of "TC-1", nominal pore size: 1 μm) produced by molding a cellulose fiber filter paper into a pleated pattern was used instead of the cartridge filter produced by winding a cotton spun yarn around a stainless steel core material in a twill pattern used in Example 1.

The above-prepared metalloid chelate-forming filter material was mounted to the same polypropylene housing as above. Separately, boric acid was dissolved in distilled water and the resulting solution was adjusted to a boron concentration of 10 ppm. In 10 liters of the resulting solution, 1.89 g of a fine silicon dioxide powder having a mean particle size of 10 μm was dispersed as insoluble impurity to yield a test solution. The test solution was circulated in the above-prepared filter at 25° C. at a flow rate of 15 liter/minute for 30 minutes.

Then, the concentration of boron remained in the test solution was determined to find that the concentration was reduced to 1 ppm or less. Separately, 1 liter of the test solution was allowed to pass through a membrane filter having a pore size of 0.1 μm and a removal percentage was determined by measuring the residual amount of silicon dioxide, to find that the removal percentage was 97%.

Example 5

A metalloid chelate-forming filter prepared in the same manner as in Example 1 was mounted to a stainless steel housing (produced by Advantec Toyo Kaisha, Ltd. under the trade name of "1TS"), and a test solution prepared by dispersing 0.46 g of a fine silicon dioxide powder having a mean particle size of 10 μm as insoluble impurity in 2 liters of engine oil having a boron concentration of 35 ppm was circulated therein at 25° C. at a flow rate of 1 liter/minute for 30 minutes.

Subsequently, the concentration of boron remained in the test solution was determined to find that the concentration was reduced to 1 ppm or less. Separately, 1 liter of the test solution was diluted with mineral spirit and was then allowed to pass through a membrane filter having a pore size of 0.1 μm and a removal percentage was determined by measuring the residual amount of silicon dioxide, to find that the removal percentage was 95%.

Example 6

A commercially available cartridge filter (produced by Advantec Toyo Kaisha, Ltd. under the trade name of "TCW-1-CSS", nominal pore size: 1 μm) produced by winding a cotton spun yarn around a stainless steel core material in a twill pattern was mounted to a stainless steel housing (produced by Advantec Toyo Kaisha, Ltd. under the trade name of "1TS"), and a solution prepared by dissolving 177 g of ethylenedimainetetraacetic dianhydride in 1000 ml of N,N'-dimethylformamide under heating at 80° C. was circulated therein at 80° C. at a flow rate of 15 liter/minute for 6 hours, using a circulating pump. After the reaction solution was discharged, 3000 ml of distilled water which was previously adjusted to pH of about 10 using aqueous ammonia was circulated for about 1 hour to thereby dissolve unreacted ethylenediaminetetraacetic acid. Circulation and discharge were further repeated using distilled water until the washings became neutral. Subsequently, 3000 ml of a 0.1 N aqueous sulfuric acid solution was circulated for 1 hour, and circulation and discharge were then repeated using distilled water until washings became neutral to yield a metal chelate-forming filter.

The metal chelate-forming filter was mounted to a polypropylene housing (produced by Advantec Toyo Kaisha, Ltd. under the trade name of "1PP-1-000"). Separately, 2.21 g of a fine silicon dioxide powder having a mean particle size of 10 μm was dissolved as insoluble impurity in 10 liters of an aqueous diluted sulfuric acid solution containing about 50 ppm each of Cu, Zn, Ni, and Co, where the pH was adjusted to about pH 5, to yield a test solution. The test solution was circulated in the above-prepared filter at 25° C. at a flow rate of 15 liter/minute for 30 minutes.

Subsequently, each concentration of metal ions, $Cu^{2+}$, $Zn^{2+}$, $Ni^{2+}$, and $Co^{2+}$, remained in the test solution was determined to find that any of metal ion concentrations was reduced to 1 ppm or less. Separately, 1 liter of the test solution was allowed to pass through a membrane filter having a pore size of 0.1 μm, and a removal percentage was determined by measuring the residual amount of silicon dioxide to find that the removal percentage was 98%.

Example 7

A metal chelate-forming filter was prepared in the same manner as in Example 1, except that 177 g of nitrilotriacetic anhydride was used instead of ethylenediaminetetraacetic dianhydride used in Example 6. Using the obtained metal chelate-forming filter, the same test procedures as in Example 1 were repeated to find that each concentration of metal ions, $Cu^{2+}$, $Zn^{2+}$, $Ni^{2+}$, and $Co^{2+}$, was reduced to 1 ppm or less and that the removal percentage of silicon dioxide was 98%.

Example 8

A metal chelate-forming filter was prepared in the same manner as in Example 1, except that a cartridge filter (produced by Advantec Toyo Kaisha, Ltd. under the trade name of "TC-1", nominal pore size: 1 μm) produced by molding a cellulose fiber filter paper into a pleated pattern was used instead of the cartridge filter produced by winding a cotton spun yarn around a stainless steel core material in a twill pattern used in Example 6. Using the obtained metal chelate-forming filter, the same test procedures as in Example 1 were repeated to find that each concentration of metal ions, $Cu^{2+}$, $Zn^{2+}$, $Ni^{2+}$, and $Co^{2+}$, was reduced to 1 ppm or less and that the removal percentage of silicon dioxide was 97%.

Example 9

A metal chelate-forming filter obtained in the same manner as in Example 6 was mounted to a stainless steel housing (produced by Advantec Toyo Kaisha, Ltd. under the trade name of "1TS"). A test solution was prepared by melting 2 liters of a hardened palm oil containing 1300 ppb of Ni, 30 ppb of Cu, and 460 ppb of Fe by heating to 60° C., and dispersing 0.51 g of a fine silicon dioxide powder having a mean particle size of 10 μm as insoluble impurity. The test solution was circulated in the above-prepared filter at 60° C. at a flow rate of 1 liter/minute for 5 minutes.

Subsequently, each concentration of metal ions remained in the palm oil was determined to find that the Ni concentration was reduced to 10 ppb or less and that each of Cu and Fe concentrations was reduced to 5 ppb or less. Separately, 500 ml of the test solution was diluted with trichloroethylene and was then allowed to pass through a membrane filter having a pore size of 0.1 μm, and a removal percentage was determined by measuring the residual amount of silicon dioxide to find that the removal percentage was 95%.

Example 10

A commercially available cartridge filter (produced by Advantec Co. under the trade name of "TCW-1-CSS", nominal pore size: 1 μm) produced by winding a cotton spun yarn around a stainless steel core material in a twill pattern was mounted to a stainless steel housing (produced by Advantec Toyo Kaisha, Ltd. under the trade name of "1TS") and a solution prepared by dissolving 1000 g of maleic anhydride in 1000 ml of N,N-dimethylformamide was circulated therein at 80° C. at a flow rate of 15 liter/minute for 10 hours, using a circulating pump, to thereby introduce a reactive double bond into a cotton spun yarn molecule. After the reaction solution was discharged, the filter was washed by circulating 3000 ml of an aqueous 30% acetone solution and 3000 ml of distilled water in order.

Next, a solution was prepared by adding 500 g of iminodiacetic acid (metal chelate-forming compound) to 2000 ml of distilled water and adjusting to pH 10 using sodium hydroxide. The resulting solution was circulated in the above-prepared filter having the introduced reactive double bond at 25° C. for 15 hours to thereby introduce a metal chelate-forming functional group into the cotton spun yarn constituting the filter. Subsequently, circulation and discharge of were repeated using distilled water until washings became neutral to yield a metal chelate-forming filter.

The metal chelate-forming filter was mounted to a polypropylene housing (produced by Advantec Toyo Kaisha, Ltd. under the trade name of "1PP-1-FS-000"). Separately, a test solution was prepared by dispersing 1.56 g of a fine silicon dioxide powder having a mean particle size of 10 μm as insoluble impurity in 10 liters of an aqueous diluted sulfuric acid solution containing each about 50 ppm of Cu, Zn, Ni, and Co where the pH was adjusted to pH 3. The test solution was circulated in the above-prepared filter at 25° C. at a flow rate of 15 liter/minute for 30 minutes.

Subsequently, each concentration of metal ions, $Cu^{2+}$, $Zn^{2+}$, $Ni^{2+}$, and $Co^{2+}$, remained in the test solution was determined to find that any of metal ions was reduced to 1 ppm or less. Separately, 1 liter of the test solution was allowed to pass through a membrane filter having a pore size of 0.1 μm, and a removal percentage was determined by measuring the residual amount of silicon dioxide to find that the removal percentage was 97%.

Advantages

The present invention is configured as described above. By using a natural fiber and/or a regenerated fiber as a filter material and introducing a specific functional group having a high capturing (removing) capability to metal ions or metalloid ions and into the fiber molecule, the invention can provide a chelate-forming filter which can concurrently remove metals or metalloids or compounds thereof and insoluble impurities in a liquid to be treated. The use of the chelate-forming filter can very efficiently purify the liquid to be treated.

The invented production process is a process which comprises processing a natural fiber and/or a regenerated fiber into a filter, the fiber has a functional group being reactive with a chelate-forming compound, and introducing an optional chelate-forming functional group into a fiber molecule constituting the filter. Accordingly, the type of the chelate-forming functional group can be freely changed after the fiber is processed into a filter. By using one filter which has not been subjected to a treatment for imparting the chelate-capturing capability, an optimum chelate-forming filter according to the type of a substance to be captured (to be removed) in the liquid to be treated can be easily obtained.

What is claimed is:

1. A chelate-forming filter comprising at least one of a natural fiber and a regenerated fiber, said fiber containing at least one chelate-forming functional group, said chelate-forming functional group being selected from:

a group represented by formula 1 and having an amino group and at least two hydroxyl groups combined with carbon:

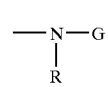

Formula 1 wherein G represents a residue of a chain sugar alcohol or a residue of a polyhydric alcohol, and R represents a hydrogen atom, a lower alkyl group or —G; and an acyl group represented by formula 2:

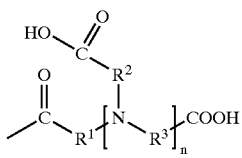

Formula 2 wherein each of $R^1$, $R^2$ and $R^3$ represents a lower alkylene group, and n denotes an integer of 1 to 4.

2. A chelate-forming filter according to claim 1, wherein G is a sugar alcohol residue in which an amino group is eliminated from the group consisting of D-glucamine, D-galactamine, D-mannosamine, D-arabitylamine, N-methyl-D-glucamine, N-ethyl-D-glucamine, N-methyl-D-galactamine, N-ethyl-D-galactamine, N-methyl-D-mannosamine and N-ethyl-D-arabitylamine and R is a hydrogen atom or a lower alkyl group, in the formula 1.

3. A chelate-forming filter according to claim 1, wherein G is a dihydroxypropyl group, and R is a hydrogen or a lower alkyl group, in the formula 1.

4. A chelate-forming filter according to claim 1, wherein said acyl group represented by the formula 2 is derived from at least one compound selected from the group consisting of nitrilotriacetic anhydride, ethylenediaminetetraacetic dianhydride, and diethylenetriaminepentaacetic dianhydride.

5. A chelate-forming filter according to claim 1, wherein said chelate-forming fiber has a capability of capturing, as a chelate, a metalloid element or a compound thereof.

6. A chelate-forming filter according to claim 5, wherein said metalloid element or a compound thereof is boron or a boron compound.

7. A chelate-forming filter according to claim 1, wherein said chelate-forming fiber has a capability of capturing, as a chelate, a heavy metal element or a compound thereof.

8. A chelate-forming filter according to claim 1, wherein an introduced amount of the chelate-forming functional group calculated by a following equation is greater than or equal to 10% by weight of the fiber, $$\frac{\text{weight of fiber after reaction} - \text{weight of fiber before reaction}}{\text{weight of fiber before reaction}} \times 100 = \frac{\text{Introduced amount}}{\text{weight percent}}.$$

9. A process for the purification of a liquid, comprising the steps of: providing a device having a chelate-forming filter, the chelate-forming filter comprising at least one of a natural fiber and a regenerated fiber, said fiber containing at least one chelate-forming functional group, the chelate-forming functional group being selected from:
a group represented by formula 1 and having an amino group and at least two hydroxyl groups combined with carbon;

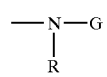

Formula 1 wherein G represents a residue of a chain sugar alcohol or a residue of a polyhydric alcohol, and R represents a hydrogen atom, a lower alkyl group or —G; and an acyl group represented by formula 2:

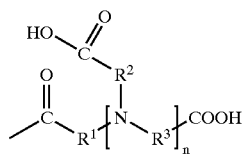

Formula 2 wherein each of $R^1$, $R^2$ and $R^3$ represents a lower alkylene group, and n denotes an integer of 1 to 4; and passing the liquid through the chelate-forming filter to concurrently remove ionic substances and insoluble impurities from the liquid.

10. A process for the purification of a liquid according to claim 9, wherein said step of passing the liquid through the chelate-forming filter includes passing an aqueous liquid or an oily liquid through the chelate-forming filter.

11. A process for producing a chelate-forming filter, comprising the steps of:
providing at least one of a natural fiber and a regenerated fiber into a filter, said fiber having a functional group;
reacting the functional group with:
an amine compound represented by formula A and having an amino group and at least two hydroxyl groups combined with carbon:

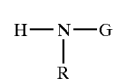

Formula A wherein G represents a residue of a chain sugar alcohol or a residue of a polyhydric alcohol, and R represents a hydrogen atom, a lower alkyl group or —G; and/or
an acid anhydride of a polycarboxylic acid represented by formula B:

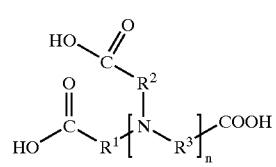

Formula B wherein each of $R^1$, $R^2$, and $R^3$ represents a lower alkylene group, and n denotes an integer of 1 to 4,
to thereby introduce a chelate-forming functional group into the fiber.

12. A process for producing a chelate-forming filter according to claim 11, wherein said step of reacting the functional group fiber includes using a cross-linking agent.

13. A process for producing a chelate-forming filter according to claim 11, wherein the amine compound represented by the formula A is at least one compound selected from the group consisting of D-glucamine, N-methyl-D-glucamine, and dihydroxypropylamine.

14. A process for producing a chelate-forming filter according to claim 11, wherein the acid anhydride of polycarboxylic acid represented by the formula B is at least one compound selected from the group consisting of nitrilotriacetic anhydride, ethylenediaminetetraacetic dianhydride, and diethylenetriaminepentaacetic dianhydride.

* * * * *